(12) United States Patent
Light-Holets et al.

(10) Patent No.: US 9,212,587 B2
(45) Date of Patent: Dec. 15, 2015

(54) EXHAUST THROTTLE CONTROL FOR AFTERTREATMENT SYSTEM THERMAL MANAGEMENT

(71) Applicant: Cummins Inc., Columbus, IN (US)

(72) Inventors: Jennifer Kay Light-Holets, Greenwood, IN (US); C. Larry Bruner, Greenwood, IN (US); Dan Langenderfer, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/188,876

(22) Filed: Feb. 25, 2014

(65) Prior Publication Data
US 2015/0240686 A1    Aug. 27, 2015

(51) Int. Cl.
*F01N 3/00* (2006.01)
*F01N 3/20* (2006.01)

(52) U.S. Cl.
CPC .................................. *F01N 3/208* (2013.01)

(58) Field of Classification Search
CPC ..... F01N 3/0842; F01N 3/2066; F01N 13/02; F01N 2610/03; F02D 41/0275; F02D 41/1441; F02D 41/0295; F02D 41/029
USPC ............................ 60/274, 285, 286, 295, 301
See application file for complete search history.

(56) References Cited

U.S. PATENT DOCUMENTS

| 5,063,736 | A  | 11/1991 | Hough et al. |
|---|---|---|---|
| 6,892,530 | B2 | 5/2005  | Montreuil et al. |
| 6,910,329 | B2 | 6/2005  | Bunting et al. |
| 6,928,806 | B2 | 8/2005  | Tennison et al. |
| 7,150,151 | B2 | 12/2006 | Mulloy et al. |
| 7,207,176 | B2 | 4/2007  | Mulloy et al. |
| 7,741,239 | B2 | 6/2010  | Hartenstein et al. |
| 7,788,909 | B2 | 9/2010  | Haseyama et al. |
| 7,877,985 | B2 | 2/2011  | Hashizume |
| 8,091,350 | B2 | 1/2012  | Suzuki |
| 8,171,724 | B2 | 5/2012  | Xu et al. |

(Continued)

FOREIGN PATENT DOCUMENTS

| EP | 1096126 | 12/2005 |
|---|---|---|
| EP | 2037091 A2 * | 3/2009 |

(Continued)

OTHER PUBLICATIONS

International Searching Authority, International Search Report & Written Opinion issued in corresponding International Application No. PCT/US2015/017230 mailed May 18, 2015, 13 pp.

*Primary Examiner* — Patrick Maines
(74) *Attorney, Agent, or Firm* — Taft, Stettinius & Hollister LLP

(57) ABSTRACT

Systems, methods and apparatus are disclosed for thermal management of an SCR catalyst in an exhaust aftertreatment system of an internal combustion engine that includes an exhaust throttle but lacks a particulate filter. The thermal management can include interpreting, initiating, and/or completing a thermal management event for the SCR catalyst for removal of contaminants such as hydrocarbons and urea deposits. The thermal management event includes at least one of closing the exhaust throttle and increasing the thermal output of the engine to expose the SCR catalyst to a sufficiently high temperature over a time period that desorbs a sufficient amount of the hydrocarbons and/or removes a sufficient amount of the urea deposits to restore SCR catalyst performance.

26 Claims, 3 Drawing Sheets

(56) References Cited

U.S. PATENT DOCUMENTS

| | | | |
|---|---|---|---|
| 8,943,803 B2* | 2/2015 | Pipis, Jr. | 60/285 |
| 2002/0078681 A1* | 6/2002 | Carberry et al. | 60/280 |
| 2003/0110761 A1 | 6/2003 | Minami | |
| 2004/0098980 A1* | 5/2004 | Montreuil et al. | 60/295 |
| 2007/0214772 A1 | 9/2007 | England | |
| 2008/0271440 A1* | 11/2008 | Xu et al. | 60/295 |
| 2008/0317643 A1* | 12/2008 | Sato | 422/168 |
| 2009/0247392 A1 | 10/2009 | Ghorishi et al. | |
| 2009/0272099 A1 | 11/2009 | Garimella et al. | |
| 2011/0030343 A1* | 2/2011 | Kiser et al. | 60/274 |
| 2011/0167805 A1* | 7/2011 | Chen | 60/286 |
| 2011/0252765 A1 | 10/2011 | Makartchouk et al. | |
| 2011/0271663 A1* | 11/2011 | Sato et al. | 60/295 |
| 2012/0216510 A1* | 8/2012 | Xu et al. | 60/274 |
| 2012/0258015 A1 | 10/2012 | Ren et al. | |
| 2013/0192206 A1* | 8/2013 | Keghelian et al. | 60/274 |
| 2014/0017794 A1 | 1/2014 | Zeng et al. | |
| 2014/0237996 A1* | 8/2014 | Yezerets et al. | 60/295 |
| 2014/0331644 A1* | 11/2014 | Kumar et al. | 60/274 |

FOREIGN PATENT DOCUMENTS

| | | |
|---|---|---|
| EP | 2037091 | 1/2011 |
| WO | 2009143258 | 5/2008 |
| WO | 2010096782 | 8/2010 |
| WO | 2012052799 | 4/2012 |

\* cited by examiner

EXHAUST THROTTLE CONTROL FOR AFTERTREATMENT SYSTEM THERMAL MANAGEMENT

BACKGROUND

Selective catalytic reduction (SCR) catalysts are subject to deterioration in performance resulting from the accumulation of various contaminants such as urea and hydrocarbons on the SCR catalyst. In exhaust systems that include, for example, active particulate filter regeneration, the particulate filter regeneration event can serve in part as a regeneration event for the SCR catalyst and other catalysts as well to remove urea deposits and to desorb hydrocarbons. However, certain aftertreatment systems do not include a particulate filter requiring periodic regeneration.

In other systems, exhaust gas temperatures are raised by controlling and opening of in inlet to a variable geometry turbine (VGT) in the exhaust system. However, VGT's are expensive and control of the opening can be complicated depending on engine operating conditions to achieve the desired result. Other systems also do not actively manage SCR catalyst contamination. As a result, the SCR catalyst may be required to operate while contaminated until operating conditions are provided that produce exhaust gas temperatures that desorb hydrocarbons and remove urea deposits. Therefore, further technological developments are desirable in this area.

SUMMARY

Systems, methods and apparatus are disclosed for exhaust throttle control for thermal management of an SCR catalyst in an exhaust aftertreatment system of an internal combustion engine that lacks a particulate filter in the aftertreatment system and does not require a VGT for exhaust flow control. Other embodiments include unique methods, systems, and apparatus to interpret, initiate, and/or complete a thermal management event for an SCR catalyst in response to at least one of a hydrocarbon desorption threshold and a urea deposit accumulation threshold on the SCR catalyst being reached. The thermal management event includes exposing the SCR catalyst to a sufficiently high temperature over a time period that removes urea deposits and/or desorb the hydrocarbons from the SCR catalyst by controlling an exhaust throttle opening and closing upstream of the SCR catalyst and fuelling of the engine to produce the desired exhaust gas temperatures.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
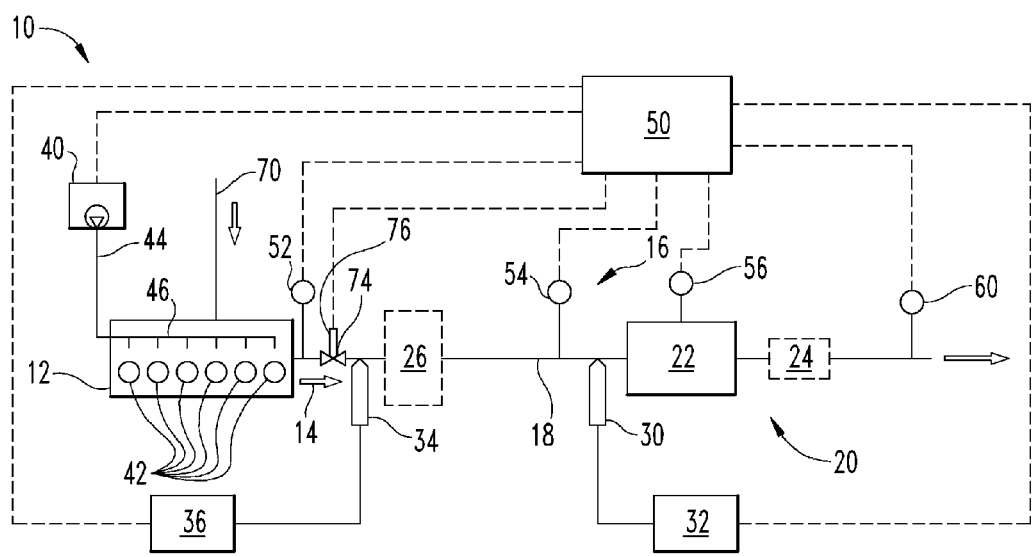
FIG. 1 is a schematic of a system that includes an internal combustion engine connected to an exhaust system with an exhaust throttle and an SCR catalyst downstream of the exhaust throttle.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referring to FIG. 1, there is shown a system 10 that includes an internal combustion engine 12 that is operable to produce an exhaust gas flow 14 into an exhaust system 16 connected to engine 12. The engine 12 may be a diesel engine, either as a stand-alone power source, in combination with other engines, or part of a hybrid power trains including an internal combustion engine for at least one of the power sources, and can be used in either mobile applications such with a vehicle or stationary applications such as a power generation or pumping system.

Exhaust system 16 includes at least one exhaust flow path 18 for conveying the exhaust gas to and through an aftertreatment system 20 and an intake system 70 to provide an air flow to engine 12. Intake system 70 may include an intake throttle (not shown), and exhaust system 16 may include an exhaust throttle 74, each or both of which can be controlled by a controller 50 to facilitate control of the thermal output from engine 12. Aftertreatment system 20 includes at least one SCR catalyst 22 operationally coupled to the at least one exhaust flowpath 18 from engine 12. It is contemplated that exhaust system 16 lacks any variable geometry turbine or a particulate filter, and, as discussed further below, exhaust throttle 74 is operable to provide thermal management of aftertreatment system 20 in conjunction with controlling the fuelling of engine 12 to produce exhaust gas flow 14 having a desired temperature for thermal management.

Exhaust throttle 74 includes an actuator 76 that is operably connected to controller 50 to receive control signals that actuate exhaust throttles 76 between on-off or open-closed positions in response to operating parameters of engine 12 and the exhaust system 16 to provide thermal management of the aftertreatment system 20. Exhaust throttle 74 can include any suitable valve member in the exhaust flow path that is actuatable between at least two positions, such as an open/on position, and a closed/off position, although full authority throttles are not precluded. The valve members of exhaust throttle 74 can be, for example, a butterfly type valve, a guillotine-type valve, or a ball-type valve. In one embodiment, the flow restricting portion of the valve includes a passage so that when the valve is closed or off, a minimum exhaust flow is permitted to pass therethrough that is set at a targeted low load condition of engine 12. Actuator 76 can be an electronic actuator, an electric motor, a pneumatic actuator, or any other suitable type of actuator to operate the valve member of the exhaust throttle 74.

System 10 may further include one or more other aftertreatment components, such as an oxidation catalyst 26 upstream of SCR catalyst 22. In one particular embodiment, aftertreatment system 20 is designed to operation without particulate filtration and omits any particulate filter from aftertreatment system 20. As a result there are no active regeneration events in the operation of system 10 that are directed to regeneration of a particulate filter.

Exhaust aftertreatment system 20 may include a reductant injector 30 upstream of SCR catalyst 22, but downstream of any catalyst that would oxidize NH3. Reductant injector 30 is supplied with reductant from a reductant source or reservoir 32 and is operable to inject reductant into exhaust flow path 18. In an exemplary embodiment the reductant is a diesel exhaust fluid (DEF) such as urea which decomposes to provide ammonia. Other embodiments utilize different reductants, for example, aqueous solutions of ammonia, anhydrous ammonia, or other reductants suitable for SCR operations. Reductant injected into exhaust flow path 18 is provided to SCR catalyst 22 which is in flow communication with exhaust flow path 18 and is operable to catalyze the reduction of $NO_x$.

Exhaust aftertreatment system 20 may further include a hydrocarbon (HC) injector 34 which is supplied with HC's from an HC source or reservoir 36 and is operationally coupled to the exhaust stream at a position upstream of oxidation catalyst 26. Other embodiments contemplate HC injector 34 is connected to a cylinder of engine 12 and hydrocarbons are added or injected from a fuel source 40 in-cylinder at a timing that is post-combustion so unburned hydrocarbons are carried into the exhaust gas flow 14, or by any other suitable means known in the art.

In one embodiment, the at least one SCR catalyst 22 is a reduction catalyst that reduces an amount of the $NO_x$ during nominal operation, at least partially converting $NO_x$ to $N_2$ to reduce the emissions of the internal combustion engine 12. In other embodiments, an ammonia oxidation (AMOX) catalyst 24 is provided downstream of SCR catalyst 22, although embodiments without an AMOX catalyst 24 are also contemplated.

An example SCR catalyst 22 is a vanadia SCR catalyst that forms a portion of an SCR aftertreatment system 20. The SCR aftertreatment system 20, during nominal operation, may reduce $NO_x$ emissions in the presence of a reductant such as ammonia or a hydrocarbon. The ammonia, where present, may be provided by injection of urea, which converts to ammonia after evaporation and hydrolysis in the exhaust gas, and/or by injection of ammonia directly, and/or by other suitable means.

During engine operation, known SCR aftertreatment systems adsorb or accumulate a portion of the contaminants passing therethrough, some of which stay on the SCR catalyst semi-permanently and which reduce the effectiveness of the catalyst to catalyze desired reactions for treating the exhaust gases, such as reducing $NO_x$. Since exhaust system 16 lacks a particulate filter that requires regeneration, the thermal conditions created during particulate filter regeneration that cause hydrothermal aging of a vanadia SCR catalyst can be avoided or minimized. Use of a vanadia SCR catalyst 22 can be advantageous due the greater activity for NO removal and tolerance to sulphur poisoning that is provided. However, SCR catalyst 22 is still subject to contamination from various constituents in the exhaust gas flow 14, such as hydrocarbons which adsorb to the SCR catalyst and the accumulation of urea deposits. The systems and method disclosed herein determine a contamination condition associated with SCR catalyst 22 and initiate a thermal management event by controlling engine fuelling and exhaust throttle 74, and in some embodiments hydrocarbon injection upstream of oxidation catalyst 26, to produce an exhaust gas flow that provides a temperature condition for SCR catalyst 22 that at least partially removes the contaminants from SCR catalyst 22. While a vanadia SCR catalyst is contemplated in a specific embodiment, other embodiments contemplate the SCR catalyst 22 may be of any type subject to reversible poisoning and/or contamination, including at least zeolite, base metals, and/or any other type of catalyst known in the art.

Exhaust flow path 18, as illustrated schematically in FIG. 1, may be provided in a variety of physical configurations and the order of the aftertreatment components could be changed from that shown in FIG. 1 and, as discussed above, certain components can be eliminated. In an exemplary embodiment exhaust flow path 18 proceeds from the output of engine 12, through a conduit to a structure containing an oxidation catalyst 26 in systems where such devices are provided. The exhaust flow path 18 further proceeds, through a second conduit to a structure containing SCR catalyst 22 that is, for example, a NOx reduction catalyst and through another conduit which outlets to the ambient environment. This embodiment may also include an ammonia oxidation AMOX catalyst 24 at a position downstream of the SCR catalyst 22, which is operable to catalyze the reaction of $NH_3$ which slips past the SCR catalyst 22.

Engine 12 produces exhaust gas flow 14 by combustion of fuel provided from fuel source 40 of a fuelling system. Fuel source 40, in the illustrated embodiment, is connected to a plurality of cylinders 42 of engine 12 with one or more fuel lines 44. In one embodiment, the fuel system is provided with a common rail 46 that distributes fuel to cylinders 42 with one or more injectors (not shown) at each cylinder 42, which are connected to a common rail 46 of the fuel system. It is further contemplated that any suitable connection arrangement with fuel source 40, injection location, and/or injector type can be used to provide fuel directly and/or indirectly to the combustion chambers of cylinders 42.

In certain embodiments, the system 10 further includes a controller 50 structured or configured to perform certain operations to initiate a thermal management event and control engine and exhaust throttle operations during the thermal management event to produce an exhaust gas flow that results in a temperature of the exhaust gas and/or SCR catalyst 22 being in a contaminant removal temperature range for a period of time to at least partially remove contaminants from SCR catalyst 22. In certain embodiments, the controller 50 forms a portion of a processing subsystem including one or more computing devices having memory, processing, and communication hardware. The controller may be a single device or a distributed device.

System 10 may further include various sensors associated with engine 12 and exhaust system 16 that provide outputs to controller 50 that are processed by controller 50 to control operations to thermally manage SCR catalyst 22. As used herein, unless specified otherwise, a sensor may be a physical sensor that directly measures an operating condition or output of system 10, or a virtual sensor in which the operating condition or output is determined from one or more other sensors and operating parameters. Not all sensors typically associated with system 10 are shown, and the illustrated sensors are provided for purposes of illustration and not limitation.

System 10 includes at least one sensor that provide an output to indicate or determine therefrom a contamination condition of SCR catalyst 22, and at least one sensor providing output to control operations of system 10 during a thermal management event for SCR catalyst 22, such as a temperature sensor. Additional sensors may be provided, but are not required, to measure the exhaust flow, sense a condition of engine 12 such as engine speed or load, measure an NH3 amount at one or more locations along exhaust system 16, such as at a mid-bed location of SCR catalyst 22 and/or an outlet of SCR catalyst 22, and contamination sensors that provide outputs indicative of a contamination condition of catalyst 22, such as hydrocarbon adsorption, urea deposit accumulation, or loss of deNOx efficiency of SCR catalyst 22.

In FIG. 1, additional sensors are shown for purposes of illustration and not limitation, such as a first sensor 52 at the exhaust output of engine 12 that is connected to controller 50 and is operable to indicate at least one of an air-fuel ratio, an exhaust flow rate, or other parameter. System 10 includes at least one second sensor 54 upstream of reduction catalyst 22 that is connected to controller 50 and is operable to indicate at least one of an engine-out NOx amount, an exhaust gas composition, or other parameter at the inlet of SCR catalyst 22. In one embodiment, second sensor 54 is upstream of oxidation catalyst 26 and used to estimate NOx at the inlet to SCR catalyst 22. System 10 also includes at least one third sensor 56 that is operable to provide at least one of a temperature of SCR catalyst 22, an NH3 amount, a contamination condition, or other parameter associated with SCR catalyst 22. System 10 may also include a fourth sensor 60 that is operable to provide an output indicative of the contaminant amounts removed from SCR catalyst 22 during a thermal management event, although other embodiments are contemplated in which the contaminant removal is measured or calculated virtually from outputs of one or more other sensors.

During operation of engine 12, the exhaust gas flow 14 that is produced contains various chemical poisons and other properties which increase the contamination of SCR catalyst 22 as exposed thereto over time. Certain contamination conditions are reversible such as those that result from various hydrocarbon species in the exhaust gas flow and urea deposit accumulation. A contamination condition of the SCR catalyst 22 can be reversed by a thermal management event mode of operation of system 10 that heats the SCR catalyst 22 to a contaminant removal temperature range for a period of time. In one instance, one or more operating conditions are adjusted so as to achieve a contaminant removal temperature range of the SCR catalyst 22. In some examples, the thermal management event enables reversal of contamination of the SCR catalyst 22 by removing an effective amount of contaminants therefrom to at least partially restore catalyst performance. Removing an effective amount of contaminants from SCR catalyst 22 includes desorbing hydrocarbons and/or removing urea deposit accumulation on SCR catalyst 22 that can influence the performance or lead to damage.

In other implementations, when the contaminant removal temperature range is achieved, material from exhaust gas and/or injected reductant accumulated on the SCR catalyst 22 can be removed effectively. In some examples, the contaminant removal temperature range is a target temperature of the exhaust gas at a particular position in the exhaust system 16, such as an engine out exhaust temperature or a temperature at the SCR catalyst 22. In some instances, the contaminant removal temperature range is a range above about 200° C.; in this instance, any hydrocarbons adsorbed onto the SCR catalyst 22 will desorb. In another instance the contaminant removal temperature range is a range between 250° C. and 300° C.; in this instance the HC injection can be enabled to allow a higher target temperature downstream of the oxidation catalyst 26. Contaminant removal temperature ranges can also be set for the removal of urea based deposits. In some cases, temperatures at the SCR catalyst 22 above 280° C. are sufficient to remove ammonia-sulphate based compounds. When hard urea deposits form, temperatures in excess of 400° C., and even in excess of 500° C. might be needed to remove the deposits in a timely manner. Accordingly, contaminant removal temperature ranges from 200° C. to 550° C. are contemplated for time periods ranging from 10 minutes to 3 hours to complete a thermal management event.

Figure 2:
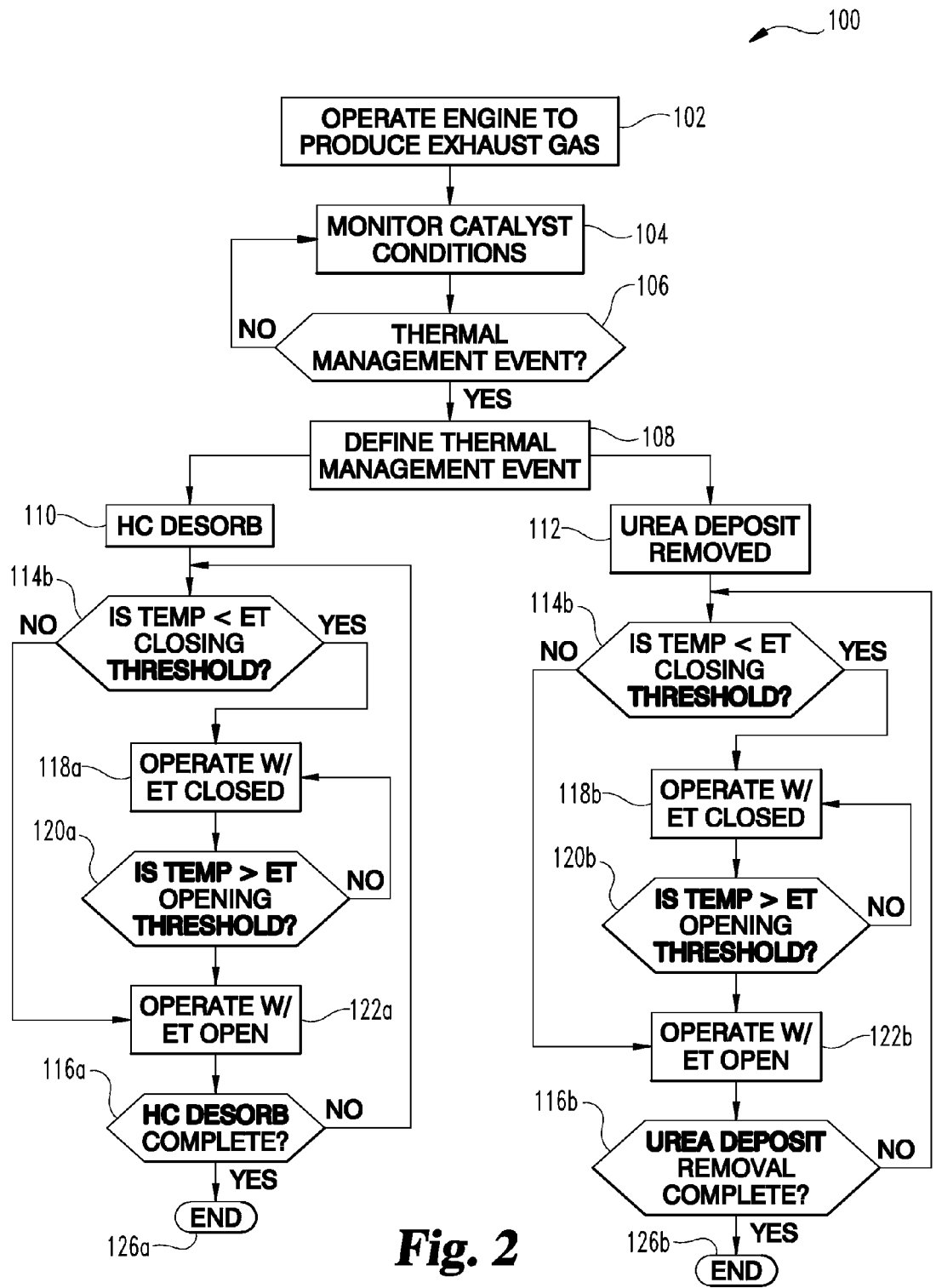
FIG. 2 is a flow diagram of one embodiment of a procedure for thermal management of the SCR catalyst.

The schematic flow diagram in FIG. 2 and related description which follows provides an illustrative embodiment of performing procedures for removing contaminants from SCR catalyst 22 in response to a contamination condition of SCR catalyst 22. Operations illustrated are understood to be exemplary only, and operations may be combined or divided, and added or removed, as well as re-ordered in whole or part, unless stated explicitly to the contrary herein. Certain operations illustrated may be implemented by a computer, such as controller 50, executing a computer program product on a computer readable medium, where the computer program product comprises instructions causing the computer to execute one or more of the operations, or to issue commands to other devices to execute one or more of the operations.

Procedure 100 includes an operation 102 to operate engine 12 to produce the exhaust gas flow 14. Procedure 100 further includes an operation 104 to monitor SCR catalyst 22 for a contamination condition of SCR catalyst 22 resulting during the operation of engine 12. A contamination condition of catalyst 22 is a condition in which the performance of SCR catalyst 22 falls below a predetermined or desired minimum performance threshold as a result of, for example, contaminants accumulating on and/or adsorbed by SCR catalyst 22. As discussed further below, a contamination condition of the SCR catalyst 22 can be indicated by passage of time since a last thermal management event, an amount of time that engine 12 has operated since the last thermal management event, and/or other time based operating parameter. A contamination condition could alternatively or additionally be indicated based on the amount of contaminants delivered to SCR catalyst 22 based on a known rate of delivery, such as a fuel amount consumed, an oil consumption amount, an engine run-time, a distance traveled, an amount of reductant injected, or other operating parameter indicative of contaminant production by engine 12 and/or aftertreatment system 20 since a last thermal management event.

Procedure 100 continues at conditional 106 to determine if the contamination condition indicates a thermal management event is required or desired for SCR catalyst 22. If conditional 106 is negative, procedure 100 returns to operation 102 to continue to monitor catalyst conditions for contamination. If conditional 106 is positive, procedure 100 continues at operation 108 to define the thermal management event in response to the contamination condition. If the contamination condition indicates hydrocarbon adsorption of more than a threshold amount, then a HC desorb thermal management event is defined at operation 110. If the contamination condition indicates urea deposit accumulation of more than a threshold amount, then a urea deposit removal thermal management event is defined at operation 112. In still other embodiments, the type of thermal management event is not defined, and procedure 100 continues with operations to produce a thermal management event to address multiple types of contamination.

In further embodiments, additional checks may be required before initiating a thermal management event, such as determining whether operating conditions are suitable for the thermal management event, or whether an operator input has been received that an impact of a thermal management event cannot be tolerated at a particular time.

Once a thermal management event is defined and initiated at one of operations 110, 112, procedure 100 continues at a conditional 114a, 114b to determine if the temperature condition (Temp) of the SCR catalyst 22 is less than an exhaust throttle (ET) closing threshold. As indicated above, the temperature condition can be determined by a temperature of the exhaust gas, the temperature of the SCR catalyst 22, or both. The exhaust throttle closing threshold can be, for example, a temperature that is the lowest temperature, or a function of the lowest temperature, of the contaminant removal temperature range for the thermal management event. In another example, the exhaust throttle closing threshold is a temperature that is less than a HC injection threshold temperature for system that employs an oxidation catalyst 26.

If conditional 114a, 114b is negative, procedure 100 continues at operation 122a, 122b to nominally operate engine 12 with exhaust throttle 74 open since the temperature condition of the SCR catalyst is in the contaminant removal temperature range. Procedure 100 continues from operation 122a, 122b to conditional 124a, 124b to determine if the HC desorb event 110 or the urea deposit removal event 112 is complete, respectively. If conditional 124a, 124b is positive, procedure 100 ends at 126a, 126b. If conditional 124a, 124b is negative, procedure 100 returns conditional 114a, 114b to determine if the temperature condition of the SCR catalyst 22 is less than the exhaust throttle closing threshold, as discussed above.

If conditional 114a, 114b is positive, procedure 100 continues at operation 118a, 118b to operate with exhaust throttle 74 closed since the temperature condition of the SCR catalyst 22 is not in the contaminant removal temperature range. With the exhaust throttle closed, fuelling of engine 12 from fuel source 40 can be conducted with a set of fuelling tables that are based on a closed exhaust throttle to provide fuel pressure, fuel amounts, start of injection, and injection timing in response to the load request to engine 12 and to increase a thermal output of engine 12, resulting in exhaust gas temperatures that is increased to provide a temperature condition for SCR catalyst 22 that is in the contaminant removal temperature range. In embodiments with an oxidation catalyst 26, the fuelling tables can also provide a post combustion injection of fuel for oxidation by oxidation catalyst 26 to increase exhaust gas temperatures.

Procedure 100 continues from operation 118a, 118b to conditional 120a, 120b to determine if the temperature condition of the SCR catalyst 22 is greater than an exhaust throttle opening threshold. A hysteresis can be provided between the exhaust throttle opening threshold and the exhaust throttle closing threshold to prevent cycling of the exhaust throttle 74 between open and closed conditions. If conditional 120a, 120b is negative, procedure 100 returns to operation 118a, 118b. If conditional 120a, 120b is positive, procedure 100 continues at operation 116a, 116b to operate with the exhaust throttle 74 open, and operation of engine 12 resumes nominally. Procedure 100 then continues at conditional 124a, 124b as discussed above to determine if the HC desorb event 110 or the urea deposit removal event 112 is complete.

Procedure 100 includes operations 118a, 118b and 122a, 122b to operate engine 12 and exhaust system 16 to obtain or maintain contaminant removal conditions in the aftertreatment system 20 that remove contaminants from SCR catalyst 22 and restore, at least partially, catalyst performance. Operating engine 12 and/or exhaust system 16 to obtain a contaminant removal temperature/SCR catalyst temperature above a threshold contaminant removal temperature and/or in a contaminant removal temperature range, and to maintain the exhaust gas temperature/SCR catalyst temperature above the contaminant removal threshold temperature for a period of time sufficient to completely or partially remove the contaminants and restore performance of SCR catalyst 22.

In one embodiment, the contaminant removal temperature conditions are obtained in part by a hydrocarbon (HC) injection operation to inject unburned hydrocarbons into the exhaust gas flow 14 to oxidize across oxidation catalyst 26 and increase the exhaust gas temperature. The injection of hydrocarbons from HC source 36 can occur with HC injector 34 and/or by late injection of hydrocarbons in cylinders 42 from fuel source 40. In addition or alternatively, procedure 100 includes operations to increase the thermal output of engine 12 to produce the thermal management event by controlling engine operations. Increasing the thermal output of engine 12 can include, for example, increasing a load on engine 12, engine braking in one or more of cylinders 42 of engine 12, manipulating one or more actuators associated with an intake throttle or with exhaust throttle 74, an EGR valve associated with an EGR system and/or an EGR cooler, a bypass around an intake air cooler, and/or an injection timing of fuel into cylinders 42 to increase the temperature of the exhaust gas exiting the cylinder 42.

In one embodiment, removing contaminants from SCR catalyst 22 includes an operation 118a, 118b to increase the thermal output of engine 12 by adjusting an engine combustion parameter in response to the thermal management event. Example combustion parameters include, without limitation, increasing temperatures of the exhaust gas exiting the cylinders, adjusting air to fuel ratios, retarding injection timing and/or the injection rate profile, adjusting EGR fractions, valve timing, and/or other parameters that, in a particular system, may be tested and known to increase the thermal output of engine 12 and increase the exhaust gas temperature. An example procedure further includes performing operations to operate system 10 to provide the thermal management event to provide the exhaust gas flow at the contaminant removal temperature range for a time period, such as between 10 minutes and 3 hours, an operation to remove an amount of the contaminants adsorbed by SCR catalyst 22 or deposited on SCR catalyst 22, and/or an operation restore a performance function capability of SCR catalyst 22. In a specific embodiment, the contaminant removal temperature range includes a target contaminant removal temperature and exhaust gas flow temperatures above a contaminant removal temperature threshold are counted in the time period. Other specific conditions are also contemplated depending on the system, catalyst formulation, and operating conditions.

Conditional 116a, 116b determines if termination conditions are present to end the operation of system 10 under the thermal management event conditions. The determination that termination conditions are present to terminate the thermal management event for SCR catalyst 22 can include, for example, accumulating a predetermined amount of time of operation in the contaminant removal temperature range in a time-temperature accumulation condition determination. The time-temperature accumulation condition that terminates the thermal management event can be determined from a look-up table or schedule stored in a memory of the controller 50. The time-temperature accumulation condition indicating termination of thermal management event can be in response to a complete or partial removal of contaminants from SCR catalyst 22. Other termination conditions can include a determination of the amount of contaminant remove exceed a threshold amount or a restoration of a performance function of SCR catalyst 22.

In certain embodiments, the controller 50 includes one or more modules structured to functionally execute the operations of the controller to initiate and control operations to produce a thermal management event for SCR catalyst 22. The one or more modules are configured to interpret a catalyst contamination condition, initiate a thermal management event in response to the catalyst contamination condition, control operations during the thermal management event, and terminate the thermal management event in response to a termination condition. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or on computer readable medium, and modules may be distributed across various hardware components. More specific descriptions of certain embodiments of controller operations are included in the section referencing FIG. 3.

Certain operations described herein include operations to interpret or determine one or more parameters. Interpreting and/or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

Figure 3:
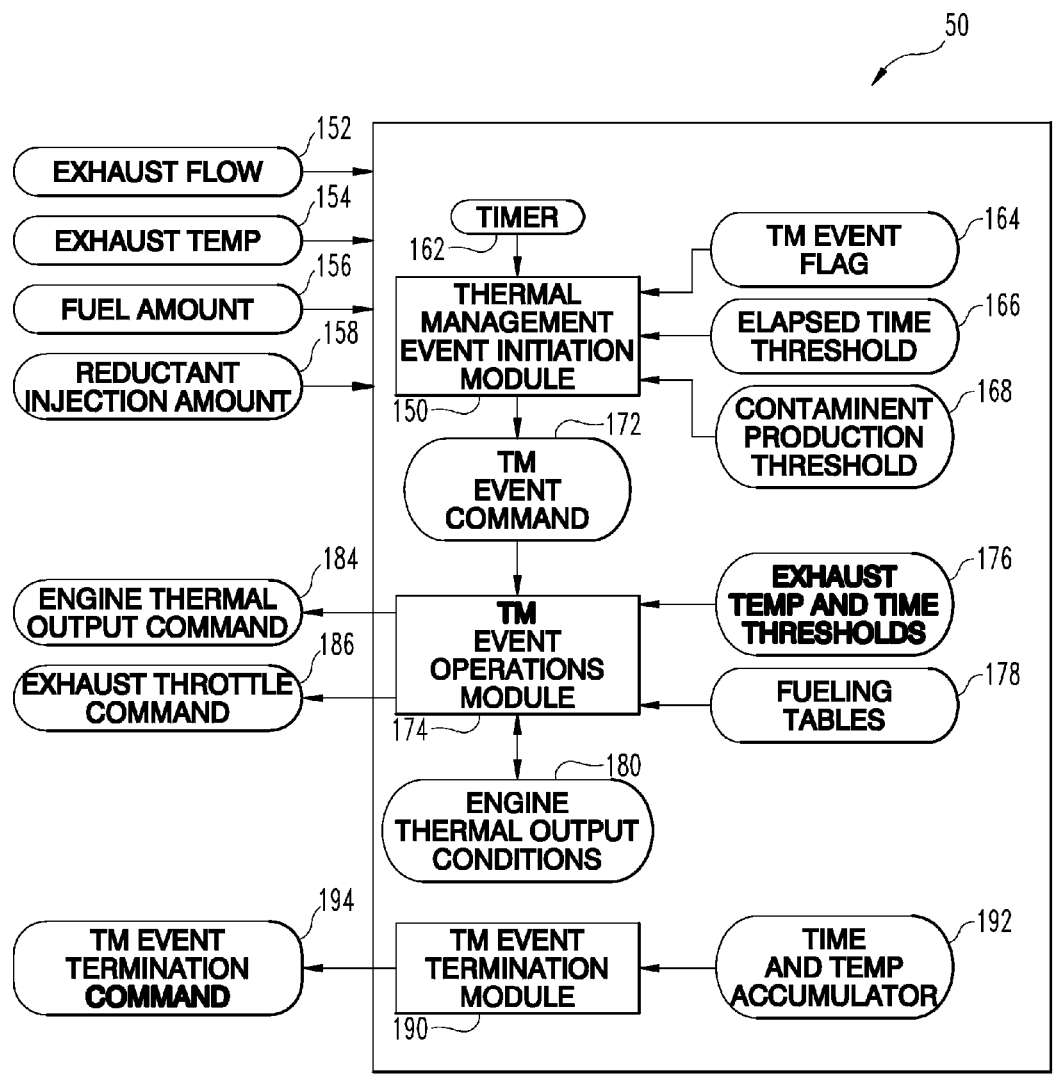
FIG. 3 is a schematic of one embodiment of a controller apparatus for thermal management of the SCR catalyst.

Controller 50 of FIG. 3 includes a number of modules structured to functionally execute operations to detect and/or reverse a contamination condition of SCR catalyst 22 in response to one or more operating parameters from the sensors of system 10. An example controller 50 includes a thermal management event initiation module 150 that interprets a contamination condition of the SCR catalyst 22. The operation to interpret the contamination condition includes any operation or combination of operations that provide a determination of a contamination condition in response to an estimate or measurement of the amount of contaminants present on the SCR catalyst 22 that reduce or inhibit the catalyst performance.

Example and non-limiting inputs to thermal management event initiation module 150 include an exhaust flow 152, an exhaust temperature 154, a fuelling amount 156, and a reductant injection amount 158. Thermal management event initiation module 150 further receives a timer input 162 and a thermal management event flag 164 indicating a time and/or indication of an occurrence a previous thermal management event and/or a type (HC desorb, urea deposit removal, etc.) of a previous thermal management event. For example, if a previous thermal management event for a urea deposit removal event has occurred in the temperature range for the HC desorb event, then the time or a portion of the time for urea deposit removal event can be counted toward the time for the HC desorb event depending on the elapsed time between the events. If a thermal management event such a HC desorb event occurred but at a temperature lower than the urea deposit removal event, then the HC desorb event would not count to lessen the duration of the urea deposit removal event.

Various thresholds are provided that, when reached, indicate a contamination condition of SCR catalyst 22. Examples of non-limiting thresholds include a contaminant production threshold 166 that is determined by, for example, determining the fuel amount consumed since the last thermal management event. Other example operating parameters indicating a contaminant production amount include, for example, an oil consumption amount, miles travelled since the last thermal management event, engine run-time, engine load, and combinations of these. When the measured contaminant production amount exceeds the contaminant production threshold 166, thermal management event initiation module 150 outputs a thermal management event command 172. As discussed above, in one embodiment the thermal management event type can further be determined depending on the contaminant production threshold that was reached, such as a hydrocarbon production threshold or urea deposit production threshold.

Another example threshold includes an elapsed time threshold 168 since the last thermal management event. The time parameter that is measured can be, for example, an engine run-time, an engine run-time above a certain threshold, or other time-based parameter. When the elapsed time parameter crosses the elapsed time threshold 168, thermal management event initiation module 150 outputs the thermal management event command 172.

Controller 50 further includes a thermal management event operations module 174 that is configured to interpret an exhaust temperature and time threshold 176, fuelling tables 178, and engine thermal output conditions 180 to control operations of engine 12 and/or exhaust system 16 via one or more commands that produce exhaust temperature conditions that are in a contaminant removal temperature range for a predetermined time period.

In one embodiment, thermal management event operations module 174 determines an engine thermal output command 184 that adjusts one or more actuators to control intake flow, fuel flow, exhaust flow, and/or EGR flow to produce the contaminant removal temperature condition. In addition or alternatively, thermal management event operations module 174 an exhaust throttle command 186 that, as discussed above, closes exhaust throttle 74 when the temperature condition of the SCR catalyst 22 is less than a first threshold and opens exhaust throttle 74 when the temperature condition of the SCR catalyst 22 exceeds a second threshold. Thermal management event operations module 174 may further determine an HC injector command that operates HC injector 34 and/or the fuel injectors of the fuelling system to provide an HC amount into the exhaust gas flow by post-combustion injection in cylinders 42 and/or directly into the exhaust gas flow 14. The engine thermal output command 184, the exhaust throttle command 186, and, if provided, the HC injector command are provided to give sufficient temperature activity to remove contaminants from SCR catalyst 22.

Controller 50 further includes a thermal management event termination module 190 that is configured to output a thermal management event termination command 194 to terminate the thermal management event for SCR catalyst 22. The thermal management event termination command 194 is determined in response to one or more thermal management event termination conditions being satisfied. In one embodiment, the thermal management event termination conditions include a time and temperature accumulation condition 192. During the thermal management event, the exhaust temperature is measured and timer 162 measures the time during which the contaminant removal exhaust temperature is provided, and thermal management event termination module 190 outputs the thermal management event termination command 194 in response to the time and temperature accumulation condition 192 being satisfied to terminate the thermal management event and return to nominal operations.

As is evident from the figures and text presented above, a variety of aspects, embodiments and refinements of the present disclosure are contemplated. According to one aspect, a method includes operating a system including an internal combustion engine to produce an exhaust gas flow through an aftertreatment system, the aftertreatment system including at least one SCR catalyst, an exhaust throttle upstream of the SCR catalyst, and no particulate filter. The method further includes determining at least one parameter associated with operation of the system that indicates a contamination condition of the SCR catalyst that is caused at least in part by accumulation of contaminants on the SCR catalyst; determining a temperature condition associated with the SCR catalyst is less than a first predetermined threshold; in response to the contamination condition, initiating a thermal management event to at least partially remove the contaminants from the SCR catalyst by increasing a temperature of the exhaust gas flow to a contaminant removal temperature range, where initiating the thermal management event includes closing the exhaust throttle in response to the temperature condition of the SCR catalyst being less than the first predetermined threshold; and operating the internal combustion engine to increase a thermal output of the internal combustion engine during the thermal management event to produce the exhaust gas flow in the contaminant removal temperature range for a period of time to remove the contaminants.

In one embodiment of the method, the at least one parameter that indicates the contamination condition includes an elapse of time since a previous thermal management event. In another embodiment, the method includes opening the exhaust throttle during the thermal management event when the temperature condition of the SCR catalyst is greater than a second predetermined threshold. In a refinement of this embodiment, a hysteresis value is applied between the first predetermined threshold and the second predetermined threshold.

In another embodiment of the method, the contamination condition is determined as a function of at least one of an amount of fuel consumed by the internal combustion engine, an amount of oil consumed by the internal combustion engine, a distance travelled under power by the internal combustion engine, and an engine run-time of the internal combustion engine since a previous thermal management event. In yet another embodiment, increasing the temperature of the exhaust gas flow further includes injecting hydrocarbons into the exhaust gas flow upstream of an oxidation catalyst in the aftertreatment system, wherein the oxidation catalyst is upstream of the SCR catalyst. In a refinement of this embodiment, the hydrocarbons are injected into at least one cylinder of the internal combustion engine post combustion.

In another embodiment, the method includes terminating the thermal management event in response to a determination that at least one thermal management event termination condition is present. In a refinement of this embodiment, the at least one termination condition includes a time and temperature accumulation in the contaminant removal temperature range exceeding a threshold amount. In another embodiment, the contaminant removal temperature range is between 200-550° C. inclusive and the time period is between 10 minutes and 3 hours. In another embodiment, the contamination condition includes at least one of an urea deposit accumulation on the SCR catalyst and an adsorption of hydrocarbons on the SCR catalyst.

According to another aspect, a method includes operating a system including an internal combustion engine to produce an exhaust gas flow through an aftertreatment system including at least one SCR catalyst and an exhaust throttle upstream of the SCR catalyst, and the aftertreatment is configured such that the exhaust gas flow is not filtered for particulates upstream of the SCR catalyst. The method also includes determining a contamination condition of the SCR catalyst, wherein the contamination condition is caused by at least one of urea deposit accumulation and hydrocarbon adsorption on the SCR catalyst; determining a temperature condition of the SCR catalyst; and, in response to the contamination condition, initiating a thermal management event to at least partially remove the contamination condition. Initiating the thermal management event includes closing the exhaust throttle in response to the temperature condition of the SCR catalyst being less than a first predetermined threshold; increasing a thermal output of the internal combustion engine to increase a temperature of the exhaust gas flow to a contaminant removal temperature range; and opening the exhaust throttle when the temperature condition of the SCR catalyst exceeds a second predetermined threshold.

In one embodiment, the temperature condition of the SCR catalyst is determined as a function of at least one of the exhaust gas temperature and a temperature of the SCR catalyst. In another embodiment, determining the contamination condition includes determining an elapse of time since a previous thermal management event. In yet another embodiment, determining the contamination condition includes determining, since a last thermal management event, at least one of an amount of fuel consumed by the internal combustion engine, an amount of oil consumed by the internal combustion engine, a distance traveled under power by the internal combustion engine, and an engine run-time of the internal combustion engine. In still another embodiment, determining the contamination condition includes determining an amount of reductant injected into the exhaust system since a previous thermal management event.

According to another aspect, a system is disclosed that includes an internal combustion engine operable to produce an exhaust gas flow and an exhaust system connected to the internal combustion engine to receive the exhaust gas flow. The exhaust system includes an aftertreatment system with a SCR catalyst and an exhaust throttle upstream of the SCR catalyst. The system also includes a plurality of sensors operable to output signals indicative of operating parameters of the internal combustion engine, the exhaust gas flow, and the SCR catalyst, the operating parameters including at least a temperature condition of the SCR catalyst. A controller is operably connected to receive the output signals from the plurality of sensors. The controller includes a thermal management event initiation module configured to interpret a contamination condition of the at least one catalyst in response to the operating parameters and initiate a thermal management event in response to the contamination condition and a thermal management event operations module configured to, in response to initiation of the thermal management event, close the exhaust throttle in response to the temperature condition of the SCR catalyst being less than a first predetermined threshold, open the exhaust throttle in response to the temperature condition of the SCR catalyst being greater than a second predetermined threshold, and operate the internal combustion engine to produce an exhaust gas flow in a contaminant removal temperature range. The controller may further include a thermal management event termination module configured to interpret at least one thermal management event termination condition during the thermal management event and output a thermal management event termination command in response to the thermal management event termination condition.

In one embodiment, the thermal management event initiation module is configured to interpret the contamination condition in response to at least one of an elapsed time since a last thermal management event and a contaminant production by the internal combustion since a last thermal management event exceeding a threshold amount. In another embodiment, the thermal management event operations module is configured to increase a temperature of the exhaust gas flow to the contaminant removal temperature range by increasing a thermal output of the internal combustion engine.

In yet another embodiment, the aftertreatment system includes an oxidation catalyst and the exhaust system is connected to a hydrocarbon source with a hydrocarbon injector upstream of the oxidation catalyst. The thermal management event operations module is configured to increase a temperature of the exhaust gas flow to the contaminant removal temperature range by providing a hydrocarbon injection command for injecting hydrocarbons from the hydrocarbon source into the exhaust system for oxidation by the oxidation catalyst. In one refinement, the hydrocarbon source is a fuel source of the internal combustion engine and the hydrocarbon injector is a fuel injector connected with at least one cylinder of the internal combustion engine, and the hydrocarbon amount is added post-combustion in the at least one cylinder.

In another embodiment, the thermal management event termination module is configured to interpret the thermal management event termination condition in response to a time and temperature accumulation limit being reached during the thermal management event. In yet another embodiment, the thermal management event temperature range is between 200-550° C. inclusive and the time period is between 10 minutes and 3 hours. In one embodiment, the aftertreatment system lacks a particulate filter. In a further embodiment, the SCR catalyst is a vanadia SCR catalyst.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
operating a system including an internal combustion engine to produce an exhaust gas flow through an aftertreatment system, the aftertreatment system including at least one selective catalytic reduction (SCR) catalyst, an exhaust throttle upstream of the SCR catalyst, and no particulate filter;
determining at least one parameter associated with operation of the system that indicates a contamination condition of the SCR catalyst, wherein the contamination condition is caused at least in part by accumulation of contaminants on the SCR catalyst;
determining that a temperature condition associated with the SCR catalyst is less than a first predetermined threshold;
in response to the contamination condition, initiating a thermal management event to at least partially remove the contaminants from the SCR catalyst by increasing a temperature of the exhaust gas flow to a contaminant removal temperature range, wherein initiating the thermal management event includes closing the exhaust throttle in response to the temperature condition of the SCR catalyst being less than the first predetermined threshold;
operating the internal combustion engine to increase a thermal output of the internal combustion engine during the thermal management event to produce exhaust gas flow in the contaminant removal temperature range for a period of time to remove the contaminants;
indicating a type of a previous thermal management event implemented to remove a type of contaminant on the SCR catalyst; and
counting time, from the previous thermal management event, towards a duration of the thermal management event to lessen the duration of the thermal management event based on the indicated type of previous thermal management event having occurred in the contaminant removal temperature range for the thermal management event.

2. The method of claim 1, wherein the at least one parameter that indicates the contamination condition includes an elapse of time since a previous thermal management event.

3. The method of claim 1, further comprising, during the thermal management event, opening the exhaust throttle when the temperature condition of the SCR catalyst is greater than a second predetermined threshold.

4. The method of claim 3, further comprising a hysteresis value between the first predetermined threshold and the second predetermined threshold.

5. The method of claim 1, wherein the contamination condition is determined as a function of at least one of an amount of fuel consumed by the internal combustion engine, an amount of oil consumed by the internal combustion engine, a distance travelled under power by the internal combustion engine, and an engine run-time of the internal combustion engine since a previous thermal management event.

6. The method of claim 1, wherein increasing the temperature of the exhaust gas flow further includes injecting hydrocarbons into the exhaust gas flow upstream of an oxidation catalyst in the aftertreatment system, wherein the oxidation catalyst is upstream of the SCR catalyst.

7. The method of claim 6, wherein the hydrocarbons are injected into at least one cylinder of the internal combustion engine post combustion.

8. The method of claim 1, further comprising terminating the thermal management event in response to a determination that at least one thermal management event termination condition is present.

9. The method of claim 8, wherein the at least one termination condition includes a time and temperature accumulation in the contaminant removal temperature range exceeding a threshold amount.

10. The method of claim 1, wherein the contaminant removal temperature range is between 200-550° C. inclusive and the period of time is between 10 minutes and 3 hours.

11. The method of claim 1, wherein the contamination condition includes urea deposit accumulation on the SCR catalyst.

12. The method of claim 1, wherein the contamination condition includes adsorption of hydrocarbons on the SCR catalyst.

13. A method comprising:
operating a system including an internal combustion engine to produce an exhaust gas flow through an aftertreatment system including at least one selective catalyst reduction (SCR) catalyst and an exhaust throttle upstream of the SCR catalyst, wherein the aftertreatment is configured such that the exhaust gas flow is not filtered for particulates upstream of the SCR catalyst;

determining a contamination condition of the SCR catalyst, wherein the contamination condition is caused by at least one of urea deposit accumulation and hydrocarbon adsorption on the SCR catalyst;

determining a temperature condition of the SCR catalyst;

in response to determining the contamination condition, initiating a thermal management event to at least partially remove the contamination condition, wherein initiating the thermal management event includes:

closing the exhaust throttle in response to the temperature condition of the SCR catalyst being less than a first predetermined threshold;

increasing a thermal output of the internal combustion engine to increase a temperature of the exhaust gas flow to a contaminant removal temperature range;

opening the exhaust throttle when the temperature condition of the SCR catalyst exceeds a second predetermined threshold;

indicating a type of a previous thermal management event implemented to remove a type of contaminant on the SCR catalyst; and counting time, from the previous thermal management event, towards a duration of the thermal management event to lessen the duration of the thermal management event based on the indicated type of previous thermal management event having occurred in the contaminant removal temperature range for the thermal management event.

14. The method of claim 13, wherein the temperature condition of the SCR catalyst is determined as a function of at least one of the exhaust gas temperature and a temperature of the SCR catalyst.

15. The method of claim 13, wherein determining the contamination condition includes determining an elapse of time since a previous thermal management event.

16. The method of claim 13, wherein determining the contamination condition includes determining, since a last thermal management event, at least one of an amount of fuel consumed by the internal combustion engine, an amount of oil consumed by the internal combustion engine, a distance traveled under power by the internal combustion engine, and an engine run-time of the internal combustion engine.

17. The method of claim 13, wherein determining the contamination condition includes determining an amount of reductant injected into the exhaust system since the previous thermal management event.

18. A system, comprising:

an internal combustion engine operable to produce an exhaust gas flow; an exhaust system connected to the internal combustion engine to receive the exhaust gas flow, the exhaust system including an aftertreatment system with a selective catalytic reduction (SCR) catalyst and an exhaust throttle upstream of the SCR catalyst;

a plurality of sensors operable to output signals indicative of operating parameters of the internal combustion engine, the exhaust gas flow, and the SCR catalyst, the operating parameters including at least a temperature condition of the SCR catalyst;

a controller operably connected to receive the output signals from the plurality of sensors, the controller configured to:

interpret a contamination condition of the SCR catalyst in response to the operating parameters and initiate a thermal management event in response to interpreting the contamination condition;

in response to initiation of the thermal management event, close the exhaust throttle in response to the temperature condition of the SCR catalyst being less than a first predetermined threshold, open the exhaust throttle in response to the temperature condition of the SCR catalyst being greater than a second predetermined threshold, and operate the internal combustion engine to produce an exhaust gas flow in a contaminant removal temperature range;

to interpret at least one thermal management event termination condition during tile thermal management event and output a thermal management event termination command in response to the thermal management event termination condition;

indicate a type of a previous thermal management event implemented to remove a type of contaminant on the SCR catalyst; and count time, from the previous thermal management event, towards a duration of the thermal management event to lessen the duration of the thermal management event based on the indicated type of previous thermal management event having occurred in the contaminant removal temperature range for the thermal management event.

19. The system of claim 18, wherein the controller is further configured to interpret the contamination condition in response to at least one of an elapsed time since a last thermal management event and a contaminant production by the internal combustion since a last thermal management event exceeding a threshold amount.

20. The system of claim 18, wherein the controller is further configured to increase a temperature of the exhaust gas flow to the contaminant removal temperature range by increasing a thermal output of the internal combustion engine.

21. The system of claim 18, wherein the aftertreatment system includes an oxidation catalyst and the exhaust system is connected to a hydrocarbon source with a hydrocarbon injector upstream of the oxidation catalyst, wherein the controller is further configured to increase a temperature of the exhaust gas flow to the contaminant removal temperature range by providing a hydrocarbon injection command for injecting hydrocarbons from the hydrocarbon source into the exhaust system for oxidation by the oxidation catalyst.

22. The system of claim 21, wherein the hydrocarbon source is a fuel source of the internal combustion engine and the hydrocarbon injector is a fuel injector connected with at least one cylinder of the internal combustion engine, and a hydrocarbon amount is added post-combustion in the at least one cylinder.

23. The system of claim 18, wherein the controller is further configured to interpret the thermal management event termination condition in response to a time and temperature accumulation limit being reached during the thermal management event.

24. The system of claim 18, wherein the thermal management event temperature range is between 200-550° C. inclusive and for a time period of between 10 minutes and 3 hours.

25. The system of claim 18, wherein the aftertreatment system lacks a particulate filter.

26. The system of claim 18, wherein the SCR catalyst is a vanadia SCR catalyst.

* * * * *